Dec. 8, 1942.  G. A. LYON  2,304,581
APPARATUS FOR APPLYING TRIM RINGS TO WHEELS
Filed July 18, 1940  2 Sheets-Sheet 1
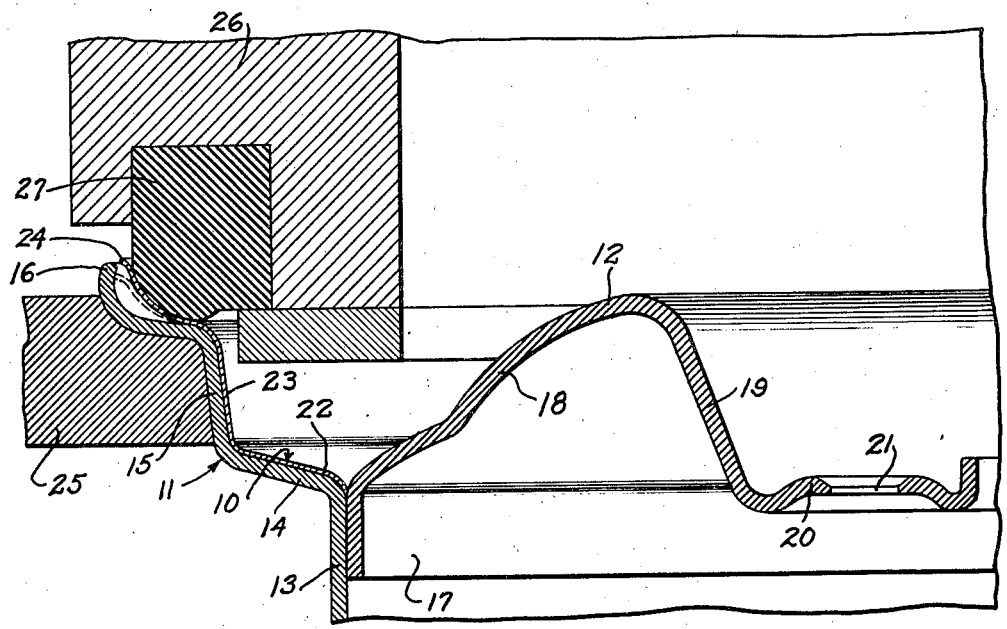
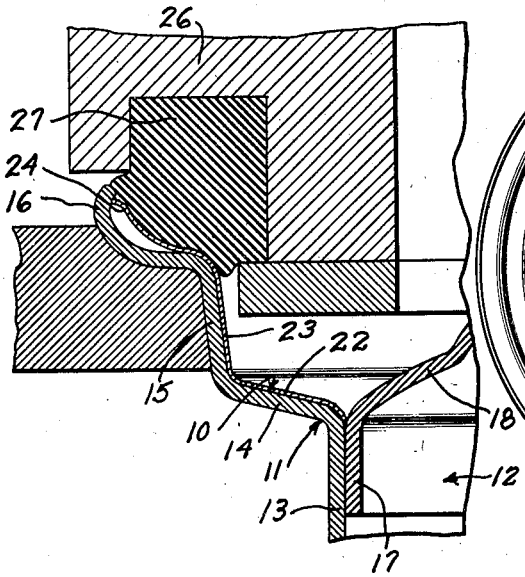
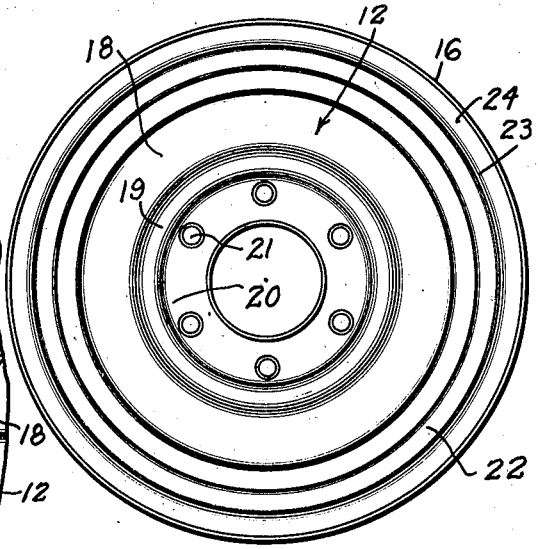
Inventor
GEORGE ALBERT LYON.

Dec. 8, 1942. G. A. LYON 2,304,581
APPARATUS FOR APPLYING TRIM RINGS TO WHEELS
Filed July 18, 1940 2 Sheets-Sheet 2
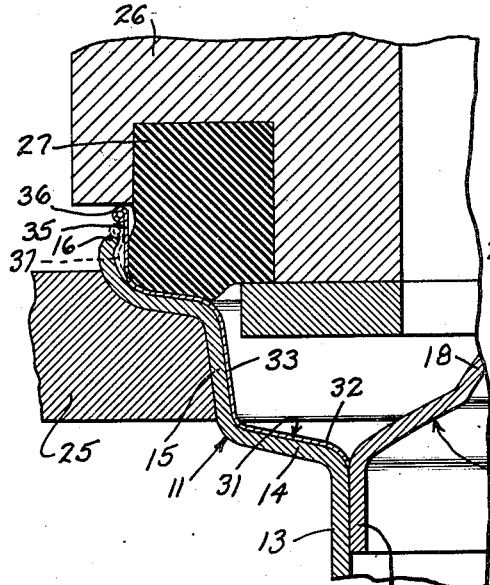
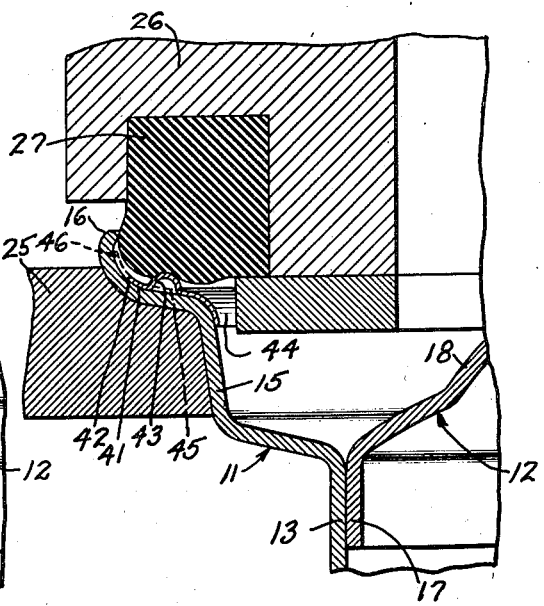
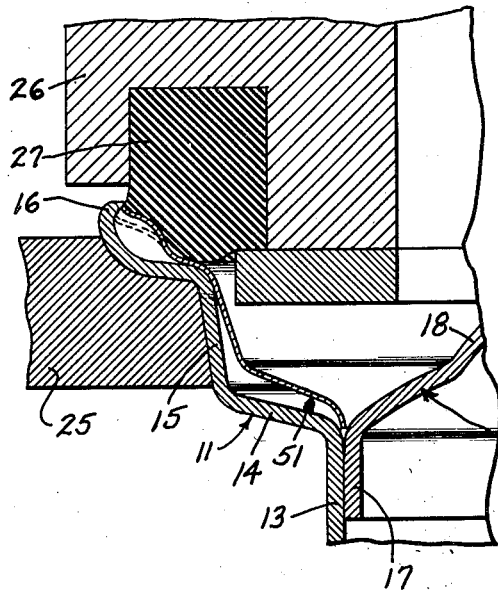
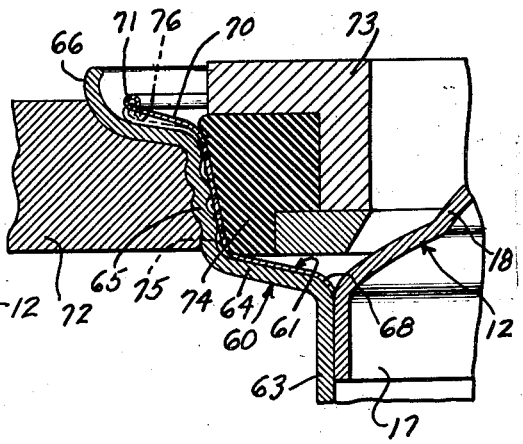
GEORGE ALBERT LYON.

Patented Dec. 8, 1942

2,304,581

UNITED STATES PATENT OFFICE 2,304,581

APPARATUS FOR APPLYING TRIM RINGS TO WHEELS

George Albert Lyon, Allenhurst, N. J.

Application July 18, 1940, Serial No. 346,083

2 Claims. (Cl. 29—84)

This invention relates to ornamental trim rings for wheels, and more particularly to an apparatus for applying trim rings to and in cooperation with wheel members.

An object of this invention is to provide an improved means for applying an ornamental trim ring to a wheel.

Another object of this invention is to provide an apparatus for applying a trim ring to a wheel in such a manner as to require no special ring retaining members or portions on the trim ring.

Still another object of this invention is to provide an apparatus for applying trim rings to wheels and securing them thereto by the retaining cooperation of the body of the trim ring with a part of the wheel.

In accordance with the general features of this invention, an ornamental trim member having plain non-serrated edges is placed upon the side of a wheel having a tire rim member and a body member and one edge or other portion of the trim ring member is forced by means of a resilient cushion into retaining engagement with one of the wheel members. In accordance with other features of the invention, the tire rim member is held in one die member while the trim ring is applied and secured to the side of the tire rim portion by means of a resilient cushion carried by another die member.

Other objects and features of this invention will more fully appear from the following detailed description taken in connection with the accompanying drawings which illustrate several embodiments thereof, and in which:

Figure 1 is a partial cross-section illustrating one embodiment of the invention;

Figure 2 is a view similar to a portion of Figure 1 and showing a later stage in the process;

Figure 3 is a side view, on a smaller scale, of a wheel having a trim ring applied to it by the process illustrated in Figures 1 and 2;

Figure 4 is a cross-sectional view illustrating another form of the invention;

Figure 5 is a cross-sectional view illustrating a third form of the invention;

Figure 6 is a cross-sectional view illustrating a fourth form of the invention; and Figure 7 is a cross-sectional view illustrating a fifth form of the invention.

As shown in the drawings:

The reference character 10 designates generally an ornamental trim member or ring embodying the features of this invention and adapted to be mounted according to this invention. This ring may be made of any suitable metallic material, but is preferably made from strip steel, such, for example, as stainless steel, and has its ends welded together. It may also be made, if it is desired, by blanking it from suitable sheet stock. This ring is adapted to be disposed over an outer side of a wheel including a wheel rim member 11 and a wheel body or hub member 12. The rim 11 is of the usual drop center type and includes a base flange 13, opposite intermediate side flanges 14, opposite intermediate base flanges 15, and opposite edge portions 16. The drop center rim 11 is illustrated as of the type which is commonly employed in the automobile vehicle art of the present day, and as is well known to those skilled in the art, is arranged to receive and accommodate a pneumatic tire (not shown).

The body part 12 of the wheel includes, in general, a rearwardly extending outer flange 17, an outer web portion 18, a generally axially rearwardly and slightly radially inwardly extending flange 19, and a radially inwardly extending wheel mounting flange 20. The rearwardly extending outer flange 17 is secured to the under side of the base flange 13 of the rim 11 in any suitable manner, such as by riveting or welding. The mounting flange 20 is provided with an annular series of apertures 21 for the reception of the wheel mounting bolts 24 (not shown), which extend therethrough into engagement with the radial attaching flange of the hub (not shown), upon which the wheel is mounted.

The trim member or ring 10 is formed with an inner flange 22 extending generally radially inwardly and slightly axially rearwardly, an intermediate flange 23 extending generally axially outwardly and slightly radially outwardly and an outer flange 24 extending generally radially outwardly and curving axially outwardly as shown in Figure 1. The inner and intermediate flanges 22 and 23 of the ring 10 are formed to lie upon the axially inner surfaces of the intermediate side flange 14 and intermediate base flange 15 of the wheel rim 11, and the outer flange 24 of the trim member is formed to curve axially away from the outer edge portion 16 of the wheel rim 11.

For securing the trim member or ring 10 to the wheel rim member 11, I have provided a lower die member 25 adapted to support the wheel rim 11 by engaging the axially inner surface of the outer edge portion 16 thereof. An upper die member 26 is provided with an annular cushion member 27 formed of rubber or similar elastic material and shaped and located for engagement with the axially outer surface of the outer flange portion 24 of the trim member or ring. The operation of securing the trim member or ring 10 to the wheel rim member 11 is accomplished by first placing the trim member or ring 10 in the position shown in Figure 1 and thereafter moving the upper die member 26 downwardly relative to the lower die member 25. This movement causes the cushion member 27 to apply sufficient pressure to the outer flange 24 of the trim ring to force the flange 24 down to the position shown in Figure 2 wherein the extreme edge of the flange 24 is forced into tight wedging engagement with the radially inner surface of the outer edge portion 16 of the wheel rim. The wedging engagement thus obtained is sufficient to permanently retain the trim member 10 in position on the wheel rim member 11. It will thus be seen that I have devised a method of permanently securing a trim member or ring to a wheel rim member without the necessity of providing special attaching means on either of the members secured together.

In Figure 4 I have shown a modified form of the invention wherein the wheel rim member 11 and the wheel body or hub member 12 are the same as in the first form of the invention but wherein the trim member or ring 31 is secured in a slightly different manner and presents a slightly different configuration. The trim member or ring 31 is formed of an inner flange 32 seated against the intermediate side flange 14 of the wheel rim member, an inner intermediate flange 33 seated against the intermediate base flange, an outer intermediate flange 34 seated against the radially inner part of the edge portion 16 of the wheel rim, and an axially outwardly extending outer flange 35 spaced slightly radially inwardly of the outer part of the edge portion 16 of the wheel rim. The outer flange 35 terminates in a beaded edge 36 located axially beyond the extremity of the edge portion 16 of the wheel rim.

In mounting the trim member or ring 31 upon the wheel rim 11, the rim 11 is supported in a lower die member 25 and the trim ring member 10 is acted upon by an upper die member 26 containing a resilient annular cushion 27 similar to those employed in the first form of the invention. When the resilient cushion 27 descends upon the outer intermediate flange 34 of the trim member, the downward pressure causes the cushion 27 to bulge laterally outwardly against the outer flange 35 of trim ring and expands it to the position shown by the dotted lines 36 in Figure 4.

It will be noted that when the outer flange of the trim ring is forced into the position shown by the dotted line 36, it lies closely against the axially in-curving outer part of the edge portion 16 of the wheel rim and is thereby prevented from moving axially outwardly. Thus the trim ring 31 is permanently secured in place without it having been necessary to provide any special fastening element or member.

In Figure 5 I have illustrated a third form of the invention wherein the wheel rim member 11 and wheel body or hub member 12 are the same as in the two previously illustrated and described forms of the invention but wherein the trim member or ring 41 differs somewhat from those shown in the previous forms of the invention. In this form of the invention, the trim member 41 lies against the axially outer side of the edge portion 16 of the rim 11 and comprises an axially outer flange 42, an arched intermediate bead portion 43 and an axially inner flange 44 which extends partly over the inner surface of the intermediate base flange 15 of the rim 11.

For securing the trim member 41 to the rim 11, a lower die member 25 and an upper die member 26 carrying a resilient annular cushion member 27 are employed, these members being similar to those employed in securing the previously described forms of trim ring. When the two die members 25 and 26 are forced toward each other the cushion member 27 first contacts the top of the arched intermediate bead 43 of the trim member 41 and flattens it out to the shape and position shown by the dotted line 45.

As the bead 43 is flattened out, the width thereof increases and the radially outer flange 42 of the trim member is forced radially outwardly to the position shown by the dotted line 46. It will be noted that, in this position, the outer flange of the trim member extends along the incurving marginal part of the edge portion 16 of the rim and that the trim ring 41 is thereby secured against axial movement and permanently fixed in place.

In Figure 6, I have shown a fourth form of the invention wherein the wheel rim member 11 and the wheel body or hub member 12 are similar to those in the previously illustrated and described forms of the invention and in which the trim member or ring 51 is generally similar to the trim member or ring 10 of the first form of the invention. The trim ring 51 differs from the trim ring 10 in the first form of the invention in that the inner and intermediate flanges 52 and 53 thereof diverge away from the intermediate side flange 14 and the intermediate base flange 15 respectively of the wheel rim 11. The outer flange 54 of the trim ring 51 has a cross-section of different curvature so that the entire trim ring 51 presents a different appearance than the trim ring 10 in the first form of the invention. The trim ring 51 is fixed to the wheel rim 11 by means of a lower die member 25 and an upper die member 26 carrying a resilient annular cushion 27 in the same way as in the first form of the invention.

In Figure 7, I have shown a fifth form of the invention wherein both the wheel rim member 60 and the trim ring member 61 differ from those shown in the previous forms of the invention. The wheel rim member 60 comprises a base flange 63, opposite intermediate side flanges 64, opposite intermediate base flanges 65, and opposite edge portions 66, as in the conventional drop-center rim, but the intermediate base flanges 65 are formed with circumferentially extending corrugations, as shown in Figure 7.

The trim ring member 61 comprises a radially outwardly and slightly axially outwardly extending inner flange portion 68, an axially outwardly and slightly radially outwardly extending intermediate flange portion 69 and a radially outwardly and slightly axially outwardly extending outer flange portion 70 terminating in a beaded edge portion 71, these portions being shaped so that the inner flange portion will lie against the axially outer surface of the wheel intermediate side flange 64, the intermediate flange portion 69 will lie across the top of the corrugations on the inner surface of the intermediate base flange 65 of the wheel rim and the outer flange portion will lie slightly spaced from the outer edge portion 66 of the wheel rim. This relationship is well illustrated in Figure 7.

The trim ring 61 is fixed to the rim member 60 by means of a set of die members comprising a lower die member 72 adapted to fit against the outer surfaces of the intermediate base flange 65 and the outer edge portion 66 of the wheel rim member 60 and an upper die member 73 provided with a resilient annular cushion 74 formed of a suitable material, such as rubber, and shaped to fit against the inner side of the intermediate flange portion 69 of the trim member 61. When the upper member 73 is moved downwardly with respect to the lower die member 72, the annular cushion member 70 is compressed vertically and is thereby caused to expand radially outwardly, thus expanding the intermediate flange portion 69 of the trim ring and forcing it to assume the configuration of the corrugations on the inner side of the intermediate base flange 65 of the wheel rim. As the intermediate flange portion 69 is forced into the corrugations, the axial length of this portion decreases, and the outer flange portion 70 and bead 71 are drawn axially inwardly to the position shown by the dotted line 76.

It will be obvious that the forming of the intermediate flange portion 69 into corrugations 75 lying within the corrugations in the intermediate base flange of the wheel rim member will securely interlock the trim member and the wheel rim member and cause them to be permanently attached to each other.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an apparatus for deflecting by axial resilient pressure a circular wheel trim part wherein said trim part has an outer zone that is to be bent with respect to its main body zone and forced into stressed retaining engagement with a wheel part, said apparatus comprising upper and lower die members facing each other and with one movable into pressing cooperation with the other, one of said die members being constructed to receive and support said wheel part with said trim part thereon and the other being provided with resilient deflecting means comprising a circular rubber embedded in the member carrying the same with a free portion projecting therefrom, said projecting free rubber portion being positioned to engage and hold the body zone of said trim part upon the bringing of the members into pressing cooperation and being so constructed and arranged that upon further movement of said die members together another part of said free portion is displaced and bulged at substantially right angles to the direction of movement of said die members whereby to resiliently bend and stress the outer zone of said trim part into biting and retaining cooperation with said wheel part.

2. In an apparatus for resiliently deflecting by axial pressure a circular wheel trim part into stressed retaining engagement with a wheel part, upper and lower die members facing each other and with one movable into pressing cooperation with the other, one of said die members being constructed to receive and support said wheel part with said trim part thereon and the other being provided with resilient deflecting means comprising a circular rubber embedded in the member carrying the same with a free portion projecting therefrom, said projecting rubber portion being positioned to engage said trim part upon the bringing of the members into pressing cooperation and to deflect resiliently said trim part into biting and retaining cooperation with said wheel part, said rubber comprising an annular ring with the projecting free portion thereof of a curved cross sectional shape such as to nest in a curved portion of said trim part adjacent an edge of the trim part whereby upon the pressing operation said free projecting portion is deflected radially outwardly and pinched over said edge to snap resiliently said edge of the trim part into biting engagement with the wheel part.

GEORGE ALBERT LYON.